US012798090B2

(12) United States Patent
Natarajan et al.

(10) Patent No.: US 12,798,090 B2
(45) Date of Patent: Nov. 17, 2026

(54) FAILURE RATE ESTIMATION AND REINFORCEMENT LEARNING SAFETY FACTOR SYSTEMS

(71) Applicant: Intel Corporation, Santa Clara, CA (US)

(72) Inventors: Venkat Natarajan, Bangalore (IN); Cornelius Buerkle, Karlsruhe (DE); Kay-Ulrich Scholl, Malsch (DE); Frederik Pasch, Karlsruhe (DE); Fabian Oboril, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 17/553,334

(22) Filed: Dec. 16, 2021

(65) Prior Publication Data

US 2022/0105629 A1 Apr. 7, 2022

(51) Int. Cl.
*B25J 9/16* (2006.01)

(52) U.S. Cl.
CPC ............. *B25J 9/1653* (2013.01); *B25J 9/161* (2013.01); *B25J 9/163* (2013.01); *B25J 9/1671* (2013.01); *B25J 9/1674* (2013.01)

(58) Field of Classification Search
None
See application file for complete search history.

(56) References Cited

U.S. PATENT DOCUMENTS

2018/0169864 A1* 6/2018 Haddadin ................ G05B 9/03
2019/0099886 A1* 4/2019 Chattopadhyay .... G05B 23/024
2020/0171658 A1* 6/2020 Kielsholm Thomsen .................. B25J 9/1664
2020/0254610 A1* 8/2020 Maier ...................... B25J 13/08
2022/0187819 A1* 6/2022 Shalaby ............ G05B 23/0221
2022/0276650 A1* 9/2022 Inam .................... G05D 1/0088
2022/0404794 A1* 12/2022 Pritchard ............... B25J 9/1694
2023/0036849 A1* 2/2023 Lu ............................ G06N 3/09
2023/0064332 A1* 3/2023 Akrotirianakis ....... B25J 9/1653
2023/0067761 A1* 3/2023 Spenninger ............ B25J 13/089
2023/0324893 A1* 10/2023 Schwimmer ..... G05B 19/41895 700/96

OTHER PUBLICATIONS

Castro Estrada, Yuri Asucena, "Vehicle Risk Assessment in Accidents Using Neural Network", The 15th Asia Pacific Industrial Engineering and Management Systems Conference APIEMS 2014, (Oct. 2014), 6 pages.

(Continued)

*Primary Examiner* — Adam R Mott
*Assistant Examiner* — Alan Lindsay Ostrow
(74) *Attorney, Agent, or Firm* — Banner & Witcoff, Ltd.

(57) ABSTRACT

Various aspects of techniques, systems, and use cases include robot safety. A device in a network may include processing circuitry and memory including instructions, which when executed by the processing circuitry, cause the processing circuitry to perform operations. The operations may include collecting telemetry data for a robot, the robot operating according to a path control plan generated using reinforcement learning with a safety factor as a reward function, and detecting that a safety event, involving a robot action, has occurred with the robot and an object. The operations may include simulating a recreation of the safety event to determine whether a simulated action matches the robot action.

25 Claims, 12 Drawing Sheets

(56) References Cited

OTHER PUBLICATIONS

Jiang, Qi, “Path Planning Method of Mobile Robot Based on Q-learning”, Journal of Physics: Conference Series 2181 (2022) 012030doi: 10.1088 1742-6596 2181 1 012030, (2022), 8 pages.
Li, Shaochuan, “Mobile Robot path planning based on Q-learning algorithm”, Proceedings of the 2nd WRC Symposiumon Advanced Robotics and Automation 2019, (8 21 2019), 6 pages.
Yang, Yang, “Multirobot path planning based on a deep reinforcement learning DQN algorithm”, CAAI Transactions on Intelligence Technology 5.3 (2020) pp. 177-183., (06 18 2020), 7 pages.
Yuchen, Liu, “Optimal Access Point Placement for Multi-AP mmWave WLANs”, MSWIM 2019 Proceedings of the 22nd International ACM Conference on Modeling, Analysis and Simulation of Wireless and Mobile Systems pp. 35-44, (Nov. 2, 2019), 10 pages.

* cited by examiner

FAILURE RATE ESTIMATION AND REINFORCEMENT LEARNING SAFETY FACTOR SYSTEMS

BACKGROUND

Robots and other autonomous agents may be programmed to complete complex real-world tasks. Collaborative robotics is an important artificial intelligence (AI) use case where multiple robots work together autonomously to cooperatively achieve complex tasks. Collaborative robotics spans a wide range of industrial applications, such as smart manufacturing assembly lines, multi-robot automotive component assembly, computer and consumer electronics fabrication, smart retail and warehouse logistics, robotic datacenters, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Safe navigation of multiple robots is crucial to many emerging AI-based applications ranging from smart robotic factories, robotic datacenters, smart shelf stocking, etc. There are many safety-critical situations, especially in joint human-robot workspaces, with high likelihood of incidents such as crashes, accidents, injuries etc. The systems and techniques described herein may be used for detecting safety issues or planning safe routes for robots in various environments. A robot as described herein may include an autonomous mobile robot (AMR). These techniques may apply to other autonomous agents and systems such as autonomous vehicles, or hybrid robotic-vehicle platforms which are mobile in environments typically reserved for vehicles and mobile equipment (e.g., roadways).

Figure 1:
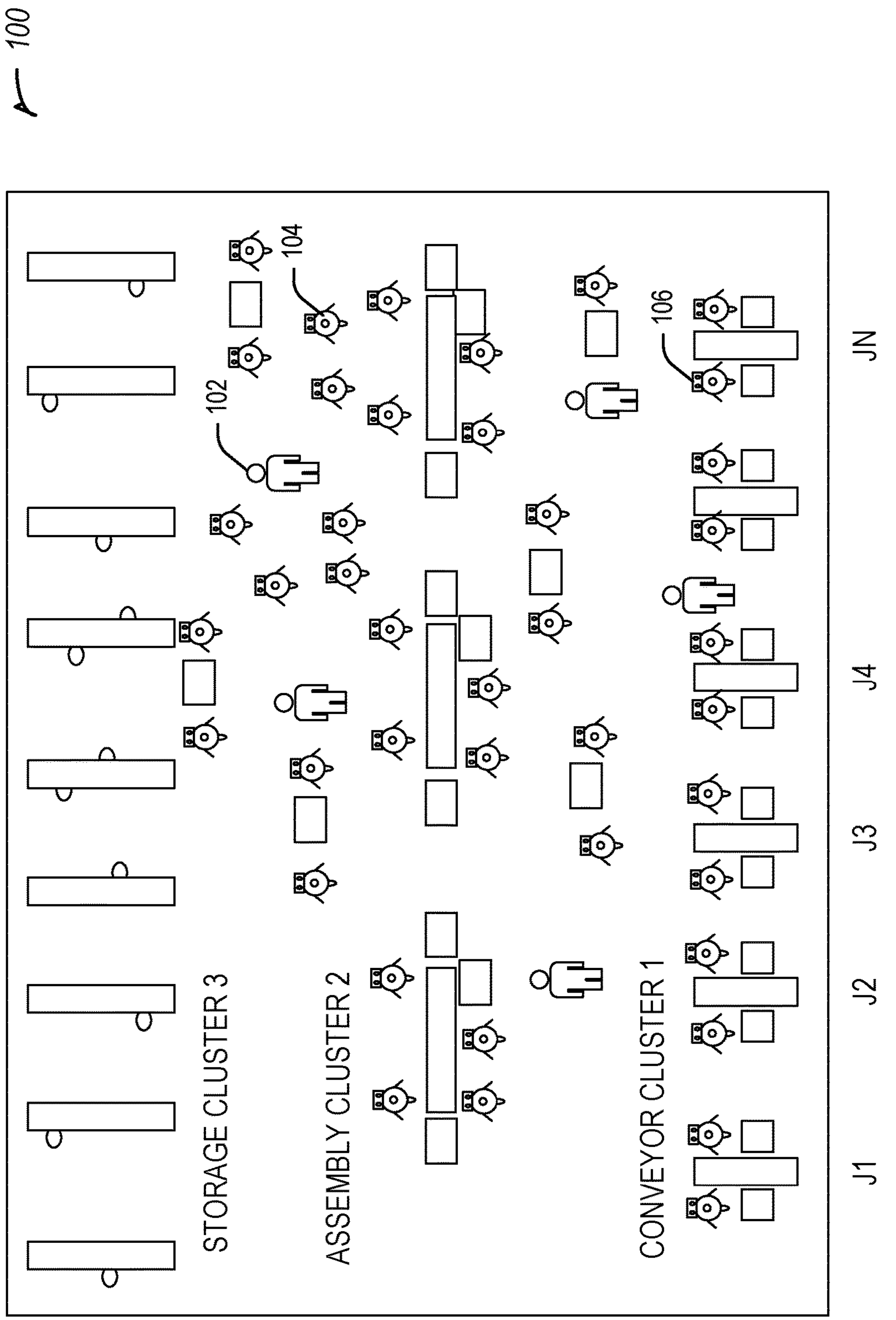
FIG. 1 illustrates multi-robot navigation scenarios in an environment according to an example.

FIG. 1 illustrates multi-robot navigation scenarios in an environment 100 according to an example. The environment 100 illustrates an example workspace, with various AMRs (e.g., AMR 104 and 106), a human 102, and various clusters, such as a conveyor cluster, an assembly cluster, or a storage cluster.

In the example environment 100, multiple AMR clusters may navigate with high speeds in congested areas in close proximity of humans. There may be safety risks in environment 100 due to random failures or erratic behavior of AMRs during navigation, for example based on poor AMR health condition, perception quality issues, loss of connectivity, low navigability spaces, etc. There are numerous parameters that may directly impact safety considerations of a multi-robot deployment in the presence of humans. In an example, a data-driven learning-based system or technique may be used to learn a safety-related behavior model from simulation and integrate the model to route planning. The route planning may minimize safety risks while also achieving an optimal route plan. During deployment, a control logic may be used to adapt or fine tune the planned route solutions to mitigate safety risks in real time, in some examples.

Typically, model-based path planners do not consider safety factors while planning routes and safety considerations are usually incorporated after the path planning process in real time. While reinforcement learning (RL) has been demonstrated to generate excellent search and planning for AMR navigation in a model-free manner and is superior to model-based approaches, RL has not factored in safety risk parameters due to multiple reasons. For example, defining complex reward structures for safety-critical scenarios (e.g., collision involving multiple navigating robots with a group of humans) is difficult and only simplistic formulations of the reward are generally possible. Also, it is extremely difficult to capture all the factors that model and affect a collision which is a highly sparse event. These factors make convergence and successful learning of a safety-aware RL policy for multi-robot navigations intractable.

The systems and techniques described herein provide innovative approach to incorporate safety into RL for route planning of AMRs. These systems and techniques include modeling different safety critical scenarios in multi-robot navigation with humans in the environment, and estimating probability of safety risk events (e.g., crash) with stochastic input parameters (e.g., dataset creation). In some examples, humans are modeled randomly in the training process. A neural network may be trained with the dataset to output a safety risk factor or an index/probability. A safety factor may be defined from the safety risk factor as a reward for the reinforcement learning model. The RL model may learn a best path by combining a shortest path objective with safety constraints and rewards. Acceptable safety thresholds may be set (e.g., by a user) for the particular application or environment. The trained RL policy may be adapted in real-time for fine control of AMR behavior in the environment, such as in the presence of humans or other safety-critical situations. A standalone control logic may be used to implement and adapt the RL policy, such as based on multi-camera and multi-sensor inputs. In an example, the neural network model may be updated with data gathered during deployment.

This approach improves the Reinforcement Learning model to make the model tractable with fewer input parameters to provide the best route under safety constraints for the AMR. The policy may be adapted using rules or conditions to fine-tune or modify the AMR response in real time. The systems and techniques provide flexibility with setting an acceptable risk level for the RL learning process by setting the appropriate risk factors. New parameters may be added as needed to the model.

Figure 2:
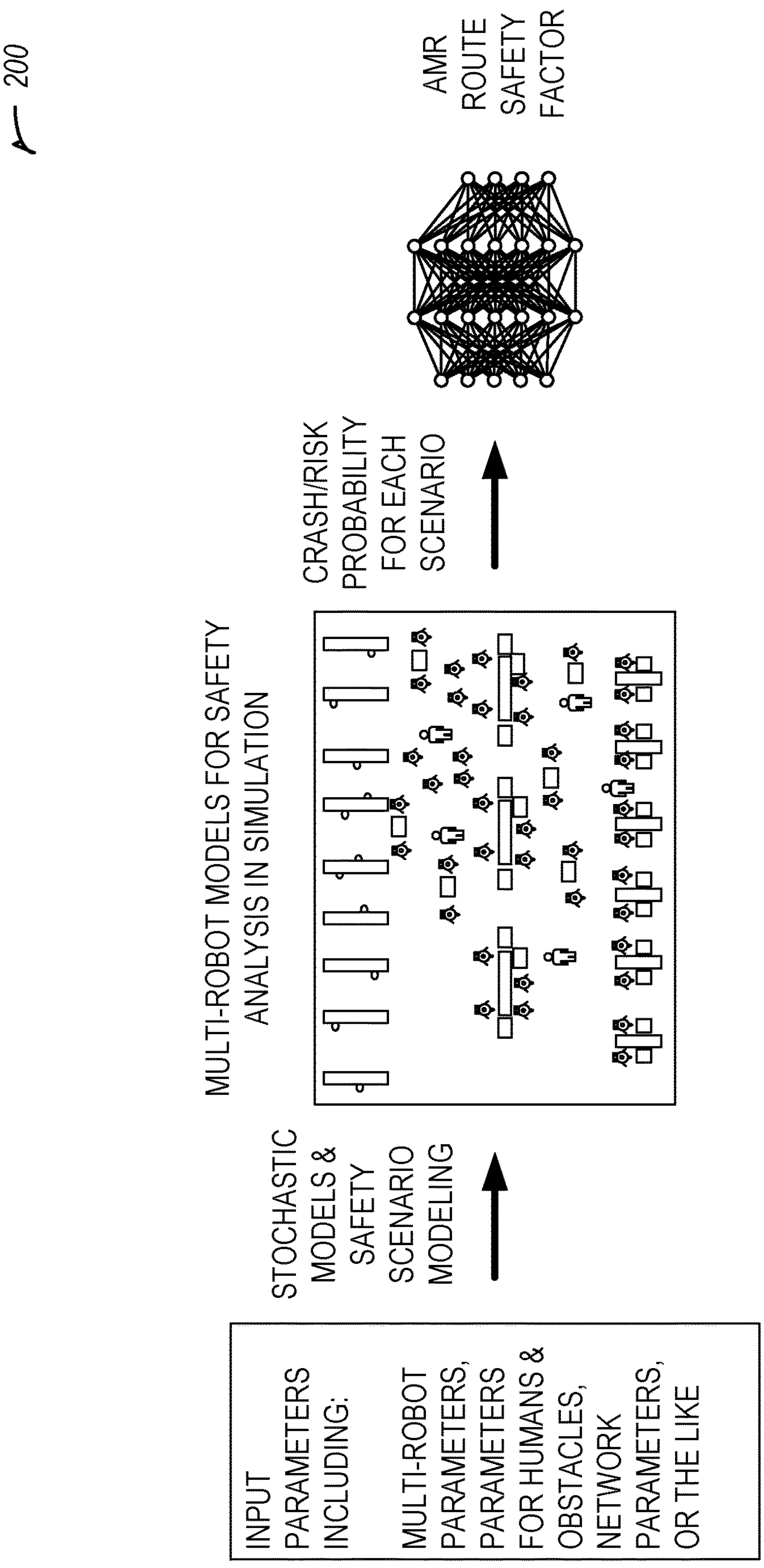
FIG. 2 illustrates a neural network for safety risk factor training and prediction according to an example.

FIG. 2 illustrates a neural network for safety risk factor training and prediction according to an example. The neural network may be a convolutional neural network. The neural network may be used to generate a safety factor for an AMR.

The neural network may be trained using crash or risk probabilities for various scenarios. The scenarios may be generated from a multi-robot model for safety analysis in simulation in an environment. Stochastic models and safety scenario modeling for generating the simulation environment may be generated based on input parameters Input parameters may include multi-robot parameters, such as a number, location, goal, speed, condition, attribute, pose, stopping distance, congestion scenarios, or the like of one or more of the robots of the multi-robots in an environment. The input parameters may include parameters for humans or obstacles, such as distribution, speed, pose, location, etc. The input parameters may include network parameters, such as multi-AP placement, signal strength distribution, bandwidth, number of hops, network delay models, or the like.

In an example, different safety scenarios may be simulated (e.g., in an advanced physics simulator) to predict a probability of a crash or an event (e.g. AMR-human collision, AMR-AMR collision, AMR-obstacle collision etc.). The simulations may model different AMR parameters (e.g., AMR condition, speeds, stopping distance assumptions, congestion scenarios) along with human distributions, pose, speeds, parameters, obstacles, perception related scenarios (e.g., low visibility, failed cameras), network parameters, simulated map errors etc. For each scenario, the parameters may be modeled as stochastic parameters with a random normal distribution. Events may be simulated using a robot discrete event simulator. Models may be created with conditions where a crash occurs. Risk levels may be allocated to the model. For example, the risk level may be 1 if a crash occurs or 0 if a crash does not occur. Several simulations may be run (e.g., hundreds) to find a probability distribution for each scenario. This data may be used to train the neural network with the crash probability as the ground truth for each of the input conditions and parameters. The neural network is trained to learn the relation of the input models and output a probability value, which includes the risk factor. The risk factor may include percentages or likelihoods, such as for low risk, moderate risk, or high risk. For example, a safety factor may include 0.93 low risk, 0.76 moderate risk, or 0.20 high risk.

Figure 3:
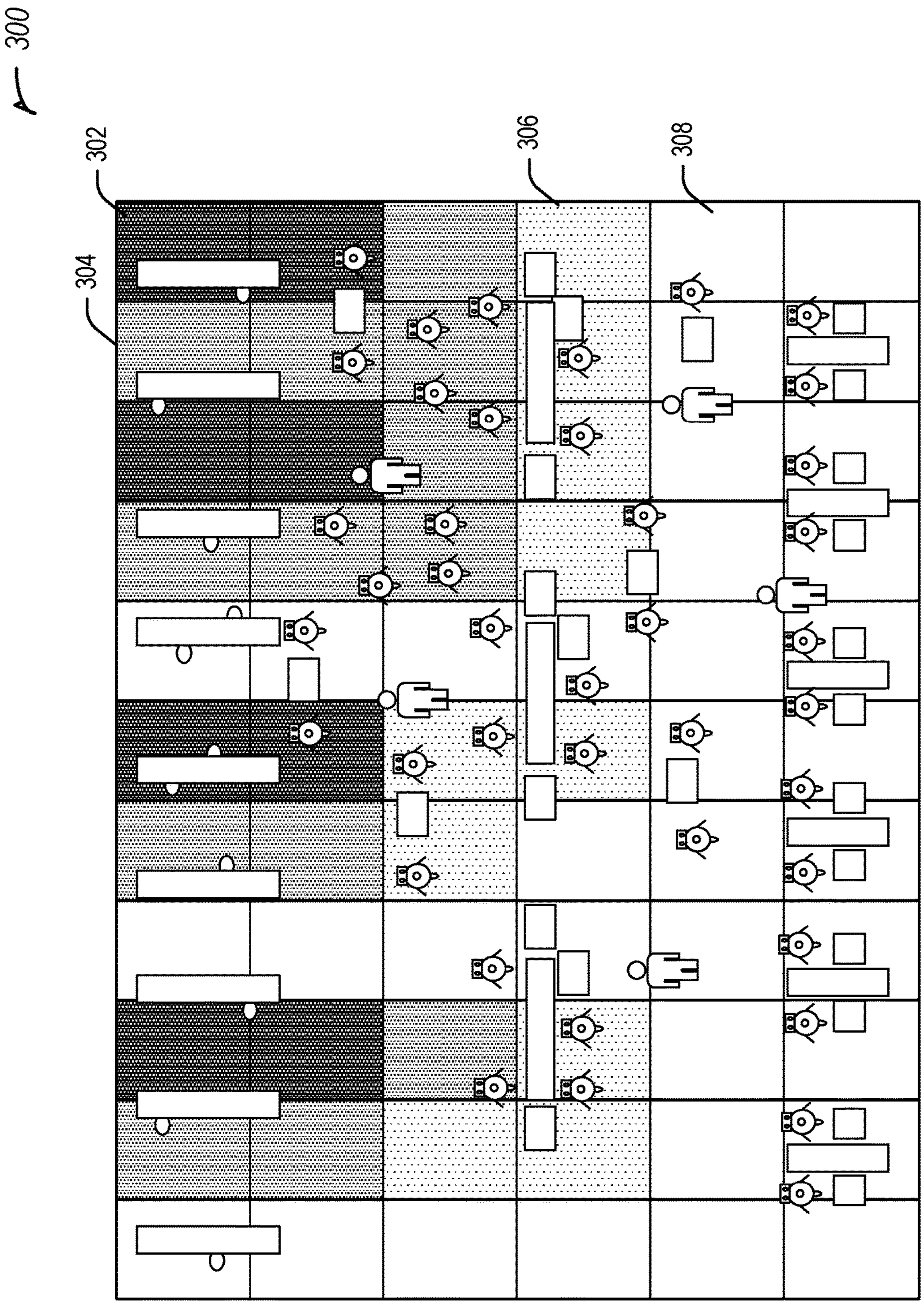
FIG. 3 illustrates a predicted safety factor distribution map according to an example.

FIG. 3 illustrates a predicted safety factor distribution map 300 according to an example. The map 300 illustrates areas of greater or lesser risk, such as were determined by a model (e.g., as an output from the neural network described above). These areas may be classified and displayed with a visual depiction (e.g., shading, color, flashing, etc.). In the specific example shown in map 300 for illustrative purposes, four types of risk factor are shown, including a highest risk area 302, a second highest risk area 304, a second lowest risk area 306 and a lowest risk area 308.

The map 300 includes a safety factor distribution across grid cells of the environment. A RL algorithm may be used to determine where an AMR moves, such as according to a goal and the risk of moving into a given cell. The RL model may include reward distributions. A reward structure includes a reward to find an optimal path (e.g., a shortest path) to a goal (e.g., to a goal cell, to an object, etc.), and includes the safety factor as a reward. The RL algorithm may be used to seek out a path for an AMR that keeps the AMR within an acceptable safety limit throughout the path (e.g., never entering a cell of high risk or never entering a cell having a risk above a threshold).

An example reward structure for a RL model for AMR route planning with a safety factor may include an algorithm with goals and rewards including the safety factor. An illustrative example may include:

If distance between AMR and final goal is reduced at next state, then reward=high (e.g., +100)

If distance between AMR and final goal is increasing at next state, then reward=low (e.g., −100)

If predicted safety factor is high in next state, then reward=high (e.g., +100)

If predicted safety factor is low in next state, then reward=low (e.g., −100)

If collision then reward=extreme low (e.g., −500)

Else, if goal, then reward=extreme high (e.g., +1000)

The reward may be computed for each state transition for an AMR. An action then may be taken by the AMR, such as move left, right, up down, or goal reached. More complicated scenarios may be used, such as additional movement (e.g., move diagonally northeast, move slowly, etc.), coordinated movement of multiple AMRs, visual or audible output from an AMR, etc.

Figure 4:
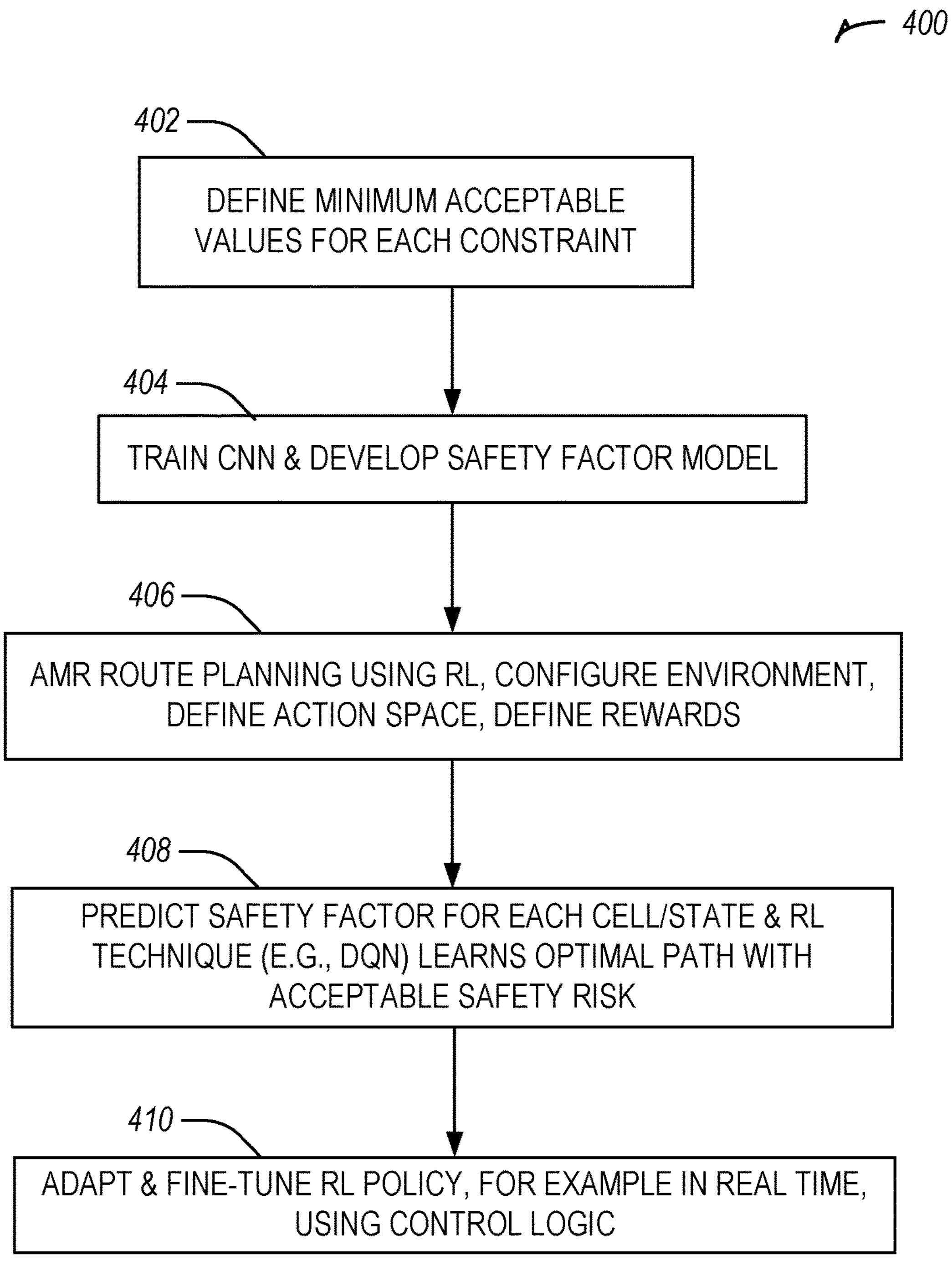
FIG. 4 illustrates a reinforced learning technique including a safety factor according to an example.

FIG. 4 illustrates a reinforced learning technique 400 including a safety factor according to an example. The technique 400 includes an operation 402 to define minimum acceptable values for each constraint. The technique 400 includes an operation 404 to train a convolutional neural network (CNN) to develop a safety factor model. The technique 400 includes an operation 406 to perform AMR route planning using a RL, configure an environment, define an action space, and define rewards. The technique 400 includes an operation 408 to predict a safety factor for each cell/state and use a RL technique (e.g., Deep Q Network (DQN)) to learn an optimal path with acceptable safety risk. The technique 400 includes an operation 410 to adapt and fine-tune the RL policy, for example in real time, using control logic.

During deployment of the RL policy in a real system, the RL policy may respond according to the learning and the datasets to provide a safe and optimal path for the AMRs across the environment. In an example, there may be scenarios wherein high risk events are possible, and in this example, the local control logic on the AMR may override the RL policy to either take evasive measures, stop or raise an alarm flag.

Figure 5:
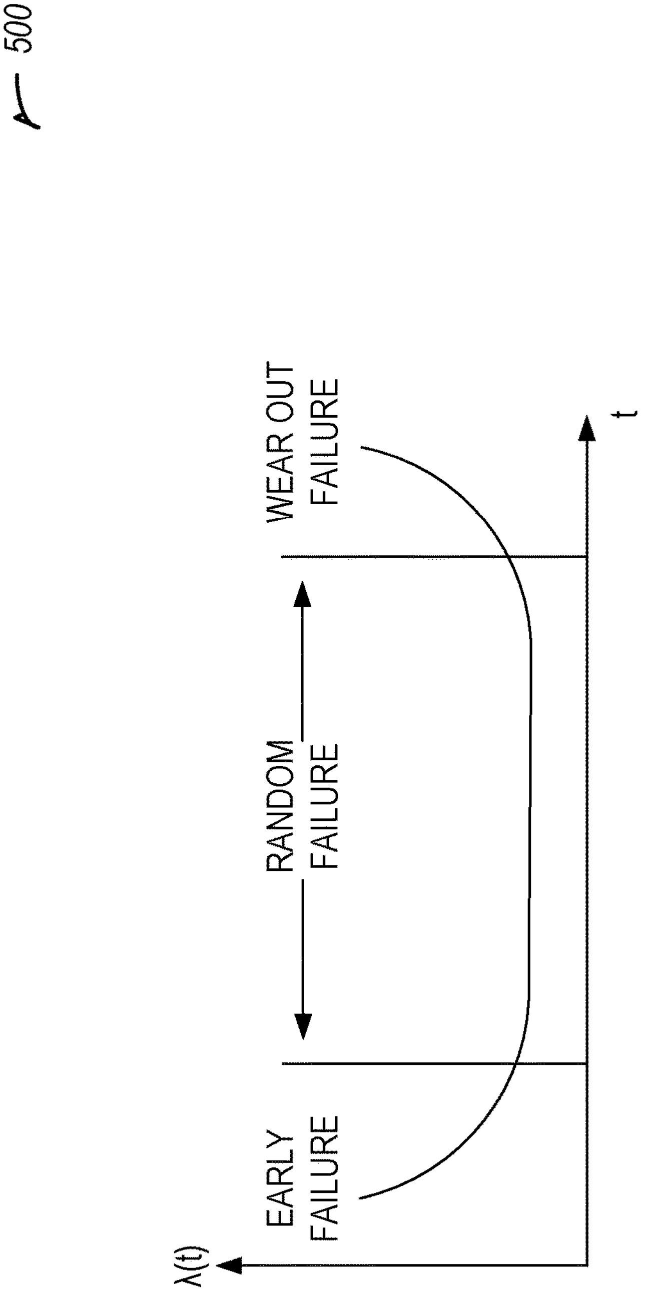
FIG. 5 illustrates a system failure rate according to an example.

FIG. 5 illustrates a system failure rate 500 according to an example. The acceptable system failure rate of an autonomous system is defined during design time. Given the criticality of a system, these failure rates are defined by the appropriate safety standards. Hence, during the design time the expected failure rate of the autonomous system is calculated and validated before the system can be released. Nevertheless, the failure rate might change during lifetime. The system failure rate 500 typically follows a “bathtub curve”, as shown in FIG. 5. The curve has a high failure rate at the beginning, followed by a rather constant failure rate for a long period of operation, and eventually an increase in failure rate due to wear out or aging phenomena. In some examples, a change of the environment or the operational design domain may positively or negatively impact the failure rate.

As the system ages, the failures increase at the wear out phase, and this may raise operational or safety issues where the actual failure rate is higher than the expected failure rate or higher than an allowed failure rate. A robot that does not fulfill the requirements of a standard due to the wear out failure may increase the risk of fatal accidents to an unacceptable level and may be a violation of the diligence of the user or provider of the system. These issues may have severe consequences. The systems and techniques described herein may be used to determine a failure rate during operation.

While aging effects may be estimated on chip-level, it is much more difficult at system-level (e.g., including actuators, wiring, software, etc.). Estimating the severe system failure rate of a robot is important to proactively monitor or remove the robot from operation before aging leads to hazardous events. In an example, a hazardous event may include violations of safety model criteria or safety model requirements. A hazardous event may be detected when longitudinal and lateral distances between an AMR and another object do not meet the requirement of a minimum safety distance.

Estimating system failure rate (e.g., how likely an AMR is to experience a safety failure at a given time or over a specified period) is challenging, as severe failures of a robot not only depend on the robot behavior itself, but also on the behavior of the objects in its environment. For example, when the robot performs a wrong (e.g., potentially hazardous) action, it may not lead to a collision, such as when the relevant objects in the environment react in an adequate way (e.g., a human moves out of the way). According to this and other examples, failures may be masked by environment actions. At the same time, such events may provide useful insights in how the failure rate evolves. A failure rate estimation system as described herein may be used to perform event monitoring and replay in the cloud or edge to provide improved failure rate prediction. While the systems and techniques described herein are described to assure safety requirements, the same approaches may be used to determine general QoS of an autonomous system.

The systems and techniques described herein may be used to detect critical events (e.g., close encounters) among a robot and other objects (e.g., humans, other robots, static obstacles, etc.). Using a digital scene representation, which may include raw sensor data, object lists, behavior decisions, or the like, these events may be re-simulated in an edge- or cloud-based system, or on a remote client system operating a simulator. The results indicate whether the robot behaved as expected (e.g., correctly without any error), or whether only the appropriate action of the other object resulted in avoidance of a collision, (e.g., a human jumping out of robot path where the robot failed to handle the situation correctly). In this case, these events are counted as failures, even though nothing severe or no collision has occurred. Using this data, the system-level failure rate may be estimated more accurately.

Figure 6:
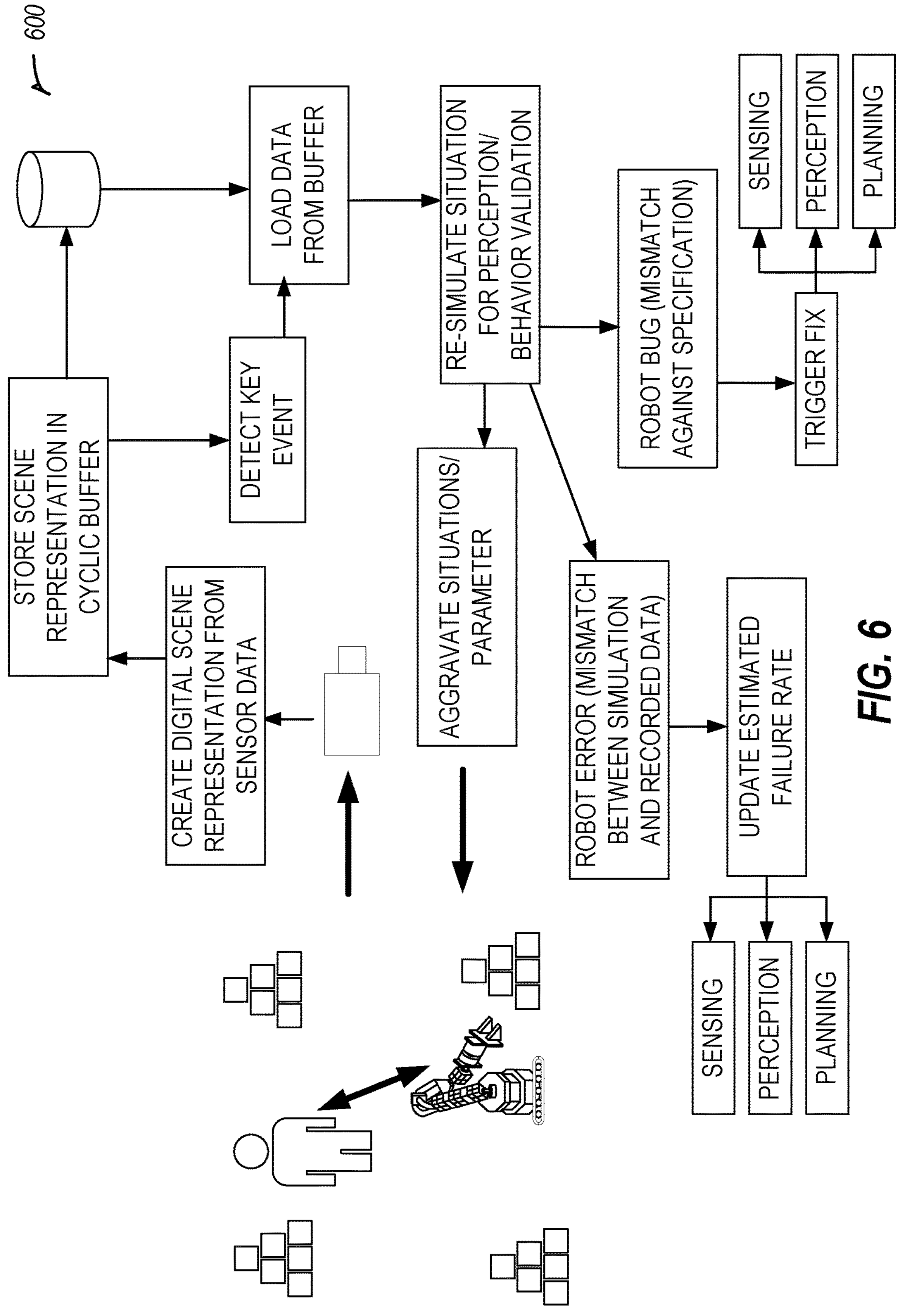
FIG. 6 illustrates a robot interaction event detection system according to an example.

FIG. 6 illustrates a robot interaction event detection system 600 according to an example. The robot interaction event detection system 600 is used to ensure that an autonomous system may fulfil its required failure rate in its current operational domain. To ensure failure rate is minimized, correct robot behavior may be defined during a design stage as part of a safety case for the robot. The correct robot behavior defines criteria on various attributes, such as motion patterns, (e.g., maximum accelerations, jerks, etc.), statistics about how often a robot is supposed to operate in a specific situation, (e.g., close to a human), or the like. During system validation an assessment on the defined values may be made, using a statistic about prominent behavior criteria, such as miss-detections of the perception system, expected distribution of accelerations, etc. The statistic may be provided by the system validation.

Robot statistics monitoring may include a statistic monitoring of the robot where behavior patterns of the robot are supervised and recorded. For example, telemetry data from the robot may be collected. Telemetry data may include sensor data (e.g., from an accelerometer, an inertial measurement unit, etc.), camera data (e.g., an image or video), pre-processed data such as object lists, or the like. As already mentioned, this may include acceleration, speed, or jerk values, distances to other robots or humans in the environment, higher level attributes like safety violations, or the like. The values may be collected on the robot itself or by an edge or cloud system. In an example, the data is stored in a centralized edge or cloud system. In some examples, remote client systems may obtain telemetry data and re-run a simulation or send the telemetry back to the centralized edge or cloud system for re-running the simulation.

Robot statistics evaluation may include an indication of whether a robot is functioning as expected. A deviation of the statistic is not necessarily an indication for a defective system. The expected failure rates are low, so “bad luck” (e.g., some failures during start of operation or even misbehavior of humans in the environment) may corrupt the statistic of the individual robot. The statistic may be used to see trends in the robot behavior that may indicate wear out issues, but the statistic may be insufficient to detect a defective robot.

Robotic issues may not be due to robot operation, but may be based instead on environment caused issues (e.g., misbehaving humans). Expected low failure rates may be exceed by a small number of events. Due to required statistically significancy, system failures may only be detected with high confidence when they persist for a longer duration.

An edge or cloud failure detection system may be used use unexpected operations of the robot, such as safety evaluations that trigger an emergency reaction of the robot, or deviation of the expected behavior to determine whether the robot is defective.

The failure detection system may use data from sensors mounted on robots or within the environment (e.g., infrastructure) with a digital scene representation (e.g., including raw sensor data, object lists, behaviors, etc.). The data and digital scene representation may be used to simulate robotic actions.

The failure detection system may include a cyclic buffer, key event detection, analysis, and robot monitoring, each of which is described in further detail below.

A cyclic buffer may be used to store relevant information, such as from sensors on a robot or in an environment. The buffer may store the last X seconds (e.g., 10, 60, etc.), so the system has access to sufficient information to regenerate the situation the robot was in. The information stored in the cyclic buffer may be used for further analysis. In an example, instead of or in addition to a cyclic buffer, the information may be stored in a database.

Key event detection may be used to analyze each scene to determine whether a key event occurred between the robot and another object. In an example, key events may include a close encounter (e.g., all situations where a robot comes closer than X to another object), activation of a safety maneuver (e.g., safe stop), a collision, other event, an accelerations that exceeds an expected value such as an average, or the like.

When a key event is detected, the buffered information may be sent to a simulation server. There, the information is entered in a queue, and simulated. For simulation, a robots' processing chain is executed in a cloud or edge simulation system and is simulated with the buffered data. The simulation identifies whether the robot behavior was correct (e.g., did the robot do its intended job to avoid an unsafe behavior), or if some parts of the robot failed. This may be identified by a mismatched of simulated versus stored robot data (e.g., according to the simulation the robot should have slowed down, but in reality, it did not, which indicates a robot failure). A match or mismatch may be defined based on a threshold comparison (e.g., under 90%, 80%, 70%, etc. of matching results in a mismatch classification).

In some examples, a failure may be due to the sensing or the planning system, and thus both parts may be validated. While for the behavior validation the simulation is sufficient, additional steps may be performed for the perception. When there are additional sensors available that provide redundant sensing information, the output of the robot's perception system may be compared with the results of other sensors. In an example, raw sensor data may be used to re-execute the perception algorithm or run redundant, more sophisticated algorithms to identify failures. When the failure is neither in the perception nor in the behavior part of the robot, then sensing system itself may be identified as the failure point.

When the behaviors do match, the behavior may be additionally checked against the specification. When there is a mismatch, a bug in the robot system is identified. Similar to the failures, the mismatch may be traced to bugs in the sensing, perception, or planning system.

In an example, simulation runs may be performed, where the behavior of the other objects may be varied (e.g., speed, position, acceleration, etc.), to see how the robot would handle those aggravated situations. Using repeated simulations with some altered variables allows the system to test the robot pipeline in a more comprehensive setting and identify potential bugs or cause of failure. When a bug is detected, an indication may be sent to the responsible person or company. When a potential robot failure is detected, the system-level failure rate may be updated. When correct behaviors are observed, the system may take no action, or output an indication that the robot acted as intended.

The system may differentiate between failures and bugs. Issues due to (fixable) bugs are not counted as failures, although the result or effect may be the same or very similar. Without this system, it may be impossible or very difficult to differentiate between bugs and failures.

The system may use an extrapolation of the current failure count into the future to anticipate likelihood of failures in the future. The past failures may be used to fit a probability density function (PDF) $f$ or cumulative distribution function (CDF) $F=\int f(x)dx$. These functions include a mathematical representation of failure rate $\lambda$ and future failures may be estimated. For example, the following relation may be used:

$$\lambda(t) = \frac{f(t)}{1-F(t)} = \frac{F'(t)}{1-F(t)} \quad \text{Eq. 1}$$

The system may conduct robot monitoring using the failure rate count or predicted failure rate count. When the failure rate of a particular robot or robot component increases above an expectation or specified threshold, but statistical evidence is not yet sufficient to remove the robot from the environment, the robot may undergo more detailed supervision. In this situation, the simulation checks may occur not just on key events, but all the time, for example continuously. The behavior of the robot may be continuously checked by redundant execution in the edge or cloud. This check may help to directly identify whether there are issues on the robot. In some examples, to maintain safety the robot may be quarantined (e.g., operate only in areas where no humans are present). When there is no evidence of an error the robot may be released from supervision.

Once in quarantine the system may be used to initiate stressing of the robot by providing feedback to the robot control system that the robot undergoes some test situations to obtain more clarity on the failure rate evolution.

Figure 7:
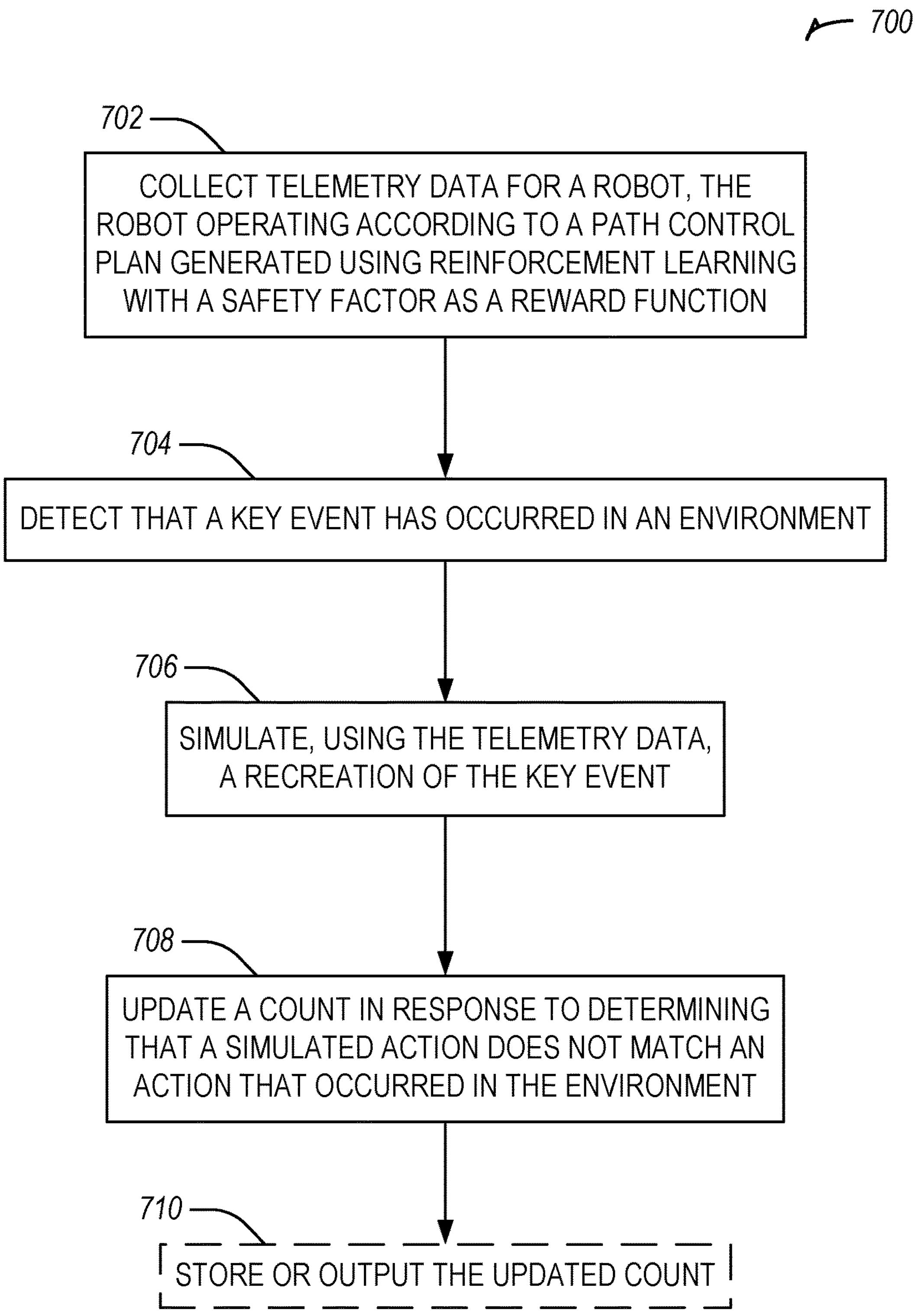
FIG. 7 illustrates a flowchart showing a technique for robot interaction event detection using a reinforcement learning control plan with a safety factor according to an example.

The system provides identification of robot failures without collisions and thus enables a more accurate system-level failure rate estimation. Once the failure rate shows an increasing trend (e.g., above a threshold indicating a wear-out phase), predictive maintenance may be performed, such as removal, quarantine, or further supervision of the robot FIG. 7 illustrates a flowchart showing a technique 700 for robot interaction event detection using a reinforcement learning control plan with a safety factor according to an example. The technique 700 may be performed by a device or devices in an edge or datacenter network (e.g., an orchestrator, a base station, a server, a mobile device, an IoT device, or the like).

The technique 700 includes an operation 702 to collect activity data for a robot, the robot operating according to a path control plan generated using reinforcement learning with a safety factor as a reward function. The activity data may include telemetry data, sensor data, processed data (e.g. object lists), or the like. The safety factor may be generated using a trained neural network. In an example, the reward function is identified based on at least one of an operational environment, a user-selected safety threshold, or a robot task. The path control plan may be iteratively adjusted using control logic, such as based on captured data (e.g., from the robot or the environment), which may be generated by a camera or other type of sensors.

The technique 700 includes an operation 704 to detect that a key event has occurred in an environment. The key event may include a robot action. The key event may include an interaction between the robot and another object (although direct contact may not have occurred). The object may be a human. Operation 704 may include determining that the robot was within a proximity threshold or within a time horizon to the other object. Operation 704 may include determining that the robot activated a safety maneuver (e.g., failed to operate safely and needed the safety maneuver to maintain safe operation). Operation 704 may include determining that a collision occurred between the robot and the other object. Operation 704 may include determining that the robot achieved an acceleration above a threshold.

The technique 700 includes an operation 706 to simulate, using the telemetry data, a recreation of the key event. The telemetry data may be stored in a cyclic buffer. The telemetry data, whether stored in a cyclic buffer or other data structure such as a database, may be stored on the device in the edge or datacenter of the network.

The technique 700 includes an operation 708 to update a count in response to determining that a simulated action does not match an action that occurred in the environment.

The technique 700 includes an optional operation 710 to store or output the updated count, for example outputting the updated count for display. Outputting the updated count may include displaying the updated count when the updated count indicates a failure rate above a minimum failure rate. The technique 700 may further include determining whether the updated count indicates that the robot is unsafe, and in response, performing a remediation for the robot including at least one of quarantining the robot away from humans, deactivating the robot, removing the robot from a current task, increasing monitoring of the robot, or the like. The technique 700 may include predicting, using the updated count, a future failure of the robot, and in an example, outputting an indication of the future failure of the robot for display or performing a remediation for the robot.

Figure 8:
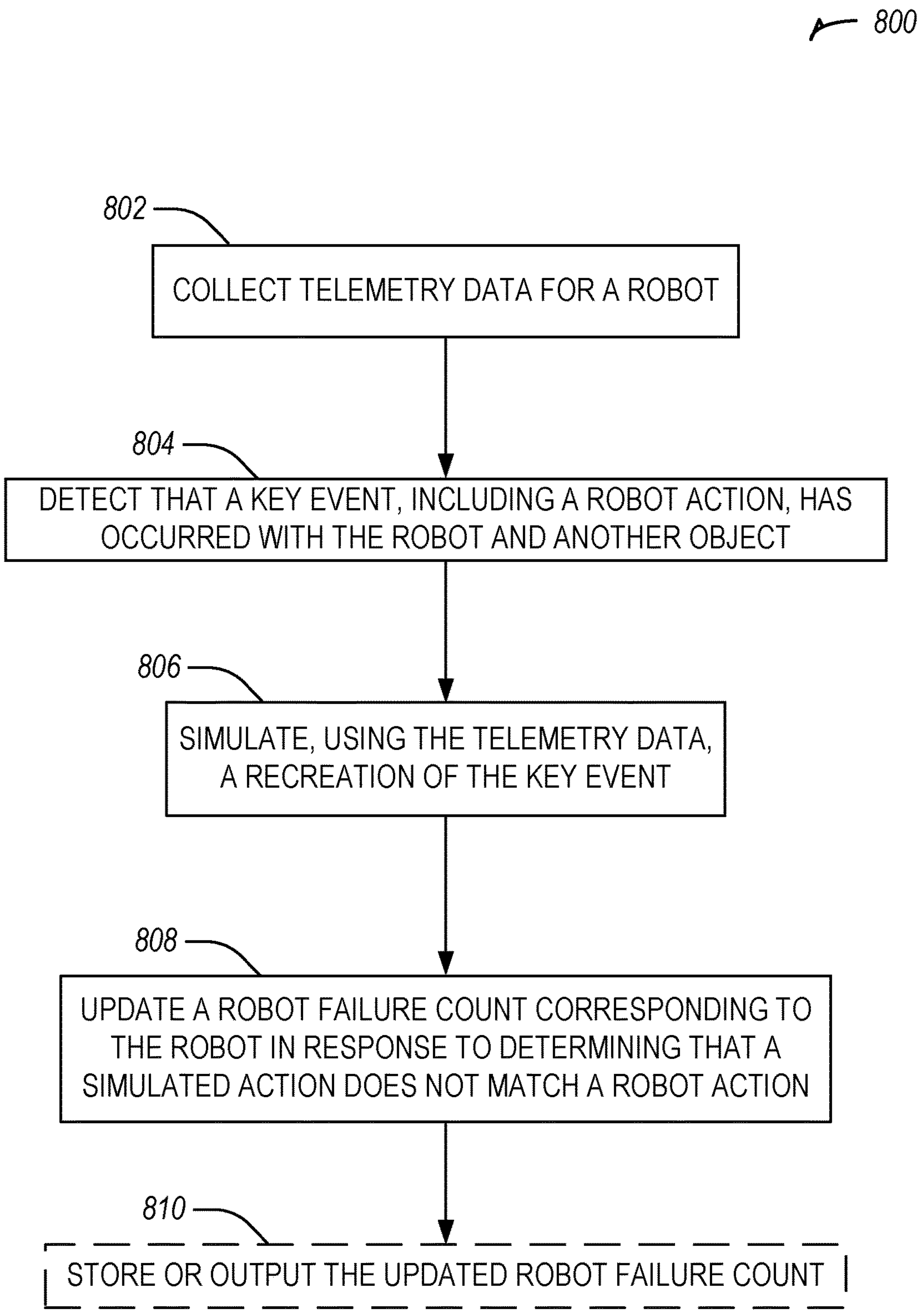
FIG. 8 illustrates a flowchart showing a technique for reinforced learning using a safety factor according to an example.

FIG. 8 illustrates a flowchart showing a technique 800 for reinforced learning using a safety factor according to an example. The technique 800 may be performed by a device or devices in an edge or datacenter network (e.g., an orchestrator, a base station, a server, a mobile device, an IoT device, or the like).

The technique 800 includes an operation 802 to collect activity data for a robot. The activity data may be stored in a cyclic buffer, a database, etc., such as in an edge device or a cloud device. The activity data may include telemetry data, sensor data, processed data (e.g. object lists), or the like.

The technique 800 includes an operation 804 to detect that a key event, including a robot action, has occurred with the robot and another object. The object may include a human, a moving object (e.g., another robot), a static object, a wall, or the like. Operation 804 may include determining that the robot was within a proximity threshold to the other object. Operation 804 may include determining that the robot activated a safety maneuver. Operation 804 may include determining that a collision occurred between the robot and the other object. Operation 804 may include determining that the robot achieved an acceleration above a threshold.

The technique 800 includes an operation 806 to simulate, using the telemetry data, a recreation of the key event.

The technique 800 includes an operation 808 to update a robot failure count corresponding to the robot in response to determining that a simulated action does not match a robot action.

The technique 800 includes an optional operation 810 to store or output the updated robot failure count. Outputting the updated count may include displaying the updated count when the updated count indicates a failure rate above a minimum failure rate. The technique 800 may further include determining whether the updated count indicates that the robot is unsafe, and in response, performing a remediation for the robot including at least one of quarantining the robot away from humans, deactivating the robot, removing the robot from a current task, increasing monitoring of the robot, or the like. The technique 800 may include predicting, using the updated count, a future failure of the robot, and in an example, outputting an indication of the future failure of the robot for display or performing a remediation for the robot.

In an example, the technique 800 includes identifying whether the failure is due to a perception error, sensor error, or planning error. In each of these cases, a different remedy may be applied. For example, for a perception error, the failure count may be updated. When the error is a sensor error, an indication may be output, such as that the sensor needs recalibration or replacing. For a planning error, the failure count may be updated or an indication may be output related to reevaluating the plan. In an example, instead of detecting an error, the technique 800 may include detecting a bug (e.g., in software or firmware of the robot), where a remedy may be triggered (e.g., an indication sent regarding fixing the bug).

Figure 9:
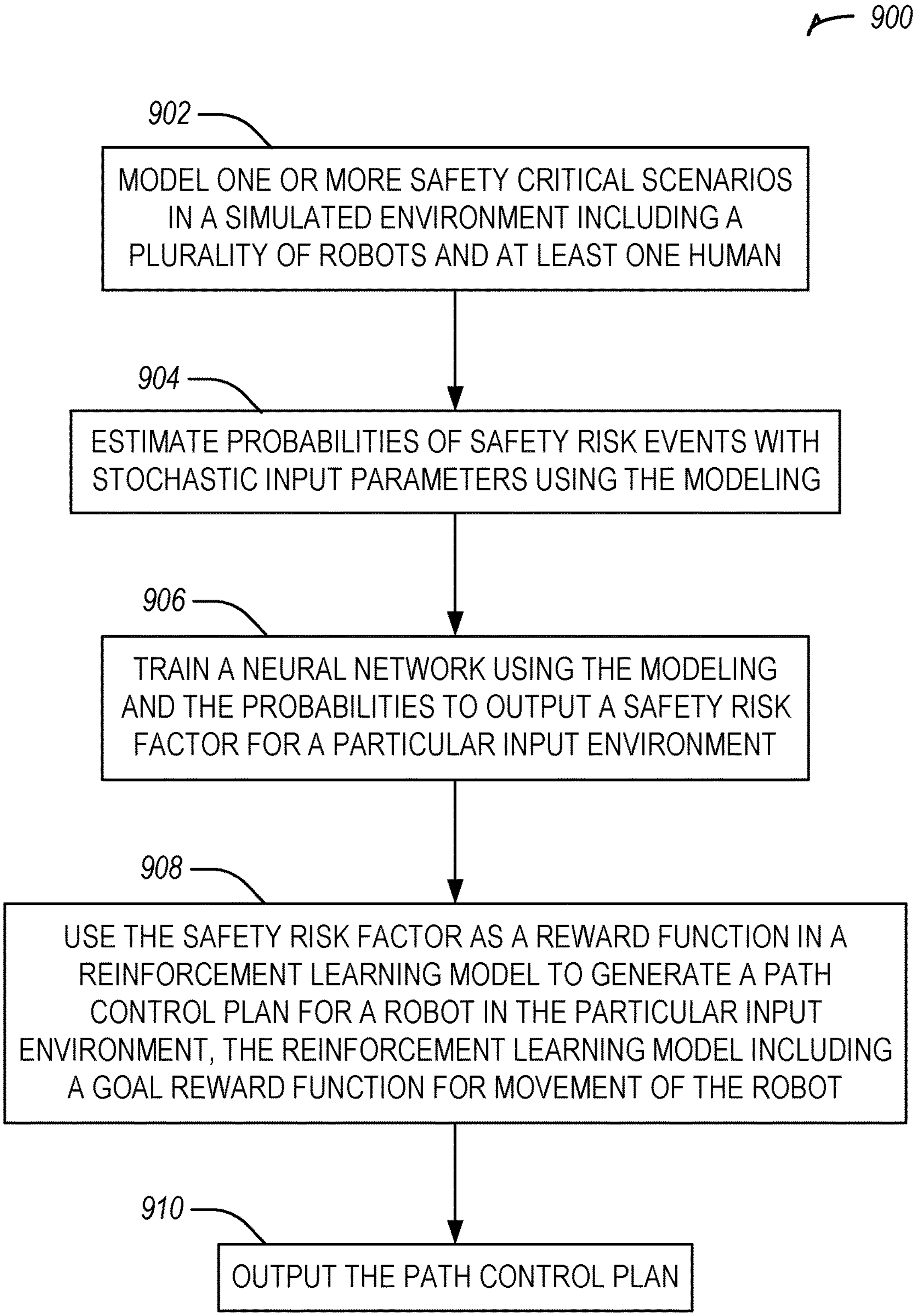
FIG. 9 illustrates a flowchart showing a technique for robot interaction event detection according to an example.

FIG. 9 illustrates a flowchart showing a technique 900 for robot interaction event detection according to an example. The technique 900 may be performed by a device or devices in an edge or datacenter network (e.g., an orchestrator, a base station, a server, a mobile device, an IoT device, or the like).

The technique 900 includes an operation 902 to model one or more safety critical scenarios in a simulated environment including a plurality of robots and at least one human.

The technique 900 includes an operation 904 to estimate probabilities of safety risk events with stochastic input parameters using the modeling. A safety risk event may be identified as occurring when the robot is within a proximity threshold to the at least one human or other object, when the robot activates a safety maneuver, when a collision is detected between the robot and the at least one human or other object, when the robot achieves an acceleration above a threshold, or the like.

The technique 900 includes an operation 906 to train a neural network using the modeling and the probabilities to output a safety risk factor for a particular input environment. The neural network may be iteratively adjusted using reinforcement learning based on captured data (e.g., via a sensor or camera of the robot or the environment).

The technique 900 includes an operation 908 to use the safety risk factor as a reward function in a reinforcement learning model to generate a path control plan for a robot in the particular input environment, the reinforcement learning model including a goal reward function for movement of the robot. The safety risk factor reward function may be identified based on at least one of an operational environment, a user-selected safety threshold, a particular robot task, or the like.

The technique 900 includes an operation 910 to output the path control plan. The path control plan may be iteratively adjusted using reinforcement learning, such as based on captured data of the robot or the environment, including sensor data or camera data, for example. Operation 910 may include sending the path control plan to the robot or an orchestrator controlling the robot.

In further examples, any of the compute nodes or devices discussed with reference to the present edge computing systems and environment may be fulfilled based on the components depicted in FIGS. 10A and 10B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 10A:
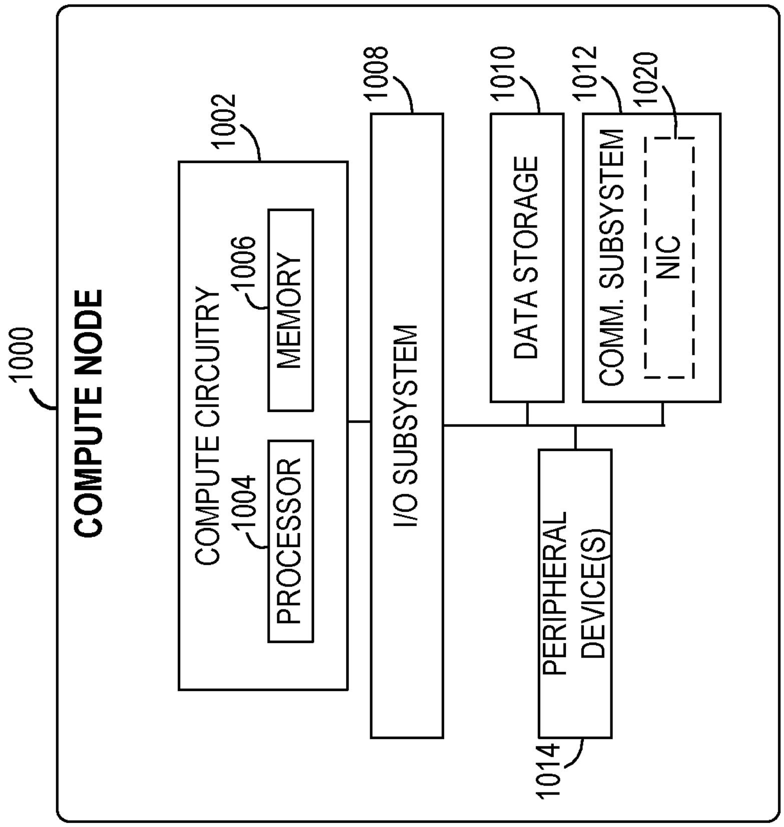
FIG. 10A provides an overview of example components for compute deployed at a compute node.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, a processing unit, a specialized or special purpose processing unit, or other processor or processing/controlling circuit.

In some examples, the processor 1004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1004 may work in coordination with each other to execute many types of operations and instructions within and on behalf of the compute node 1000.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., a gateway of an implementing computing system). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., a gateway node). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective compute node (whether a client, gateway, or aggregation node) in a computing system or like forms of appliances, computers, subsystems, circuitry, or other components.

Figure 10B:
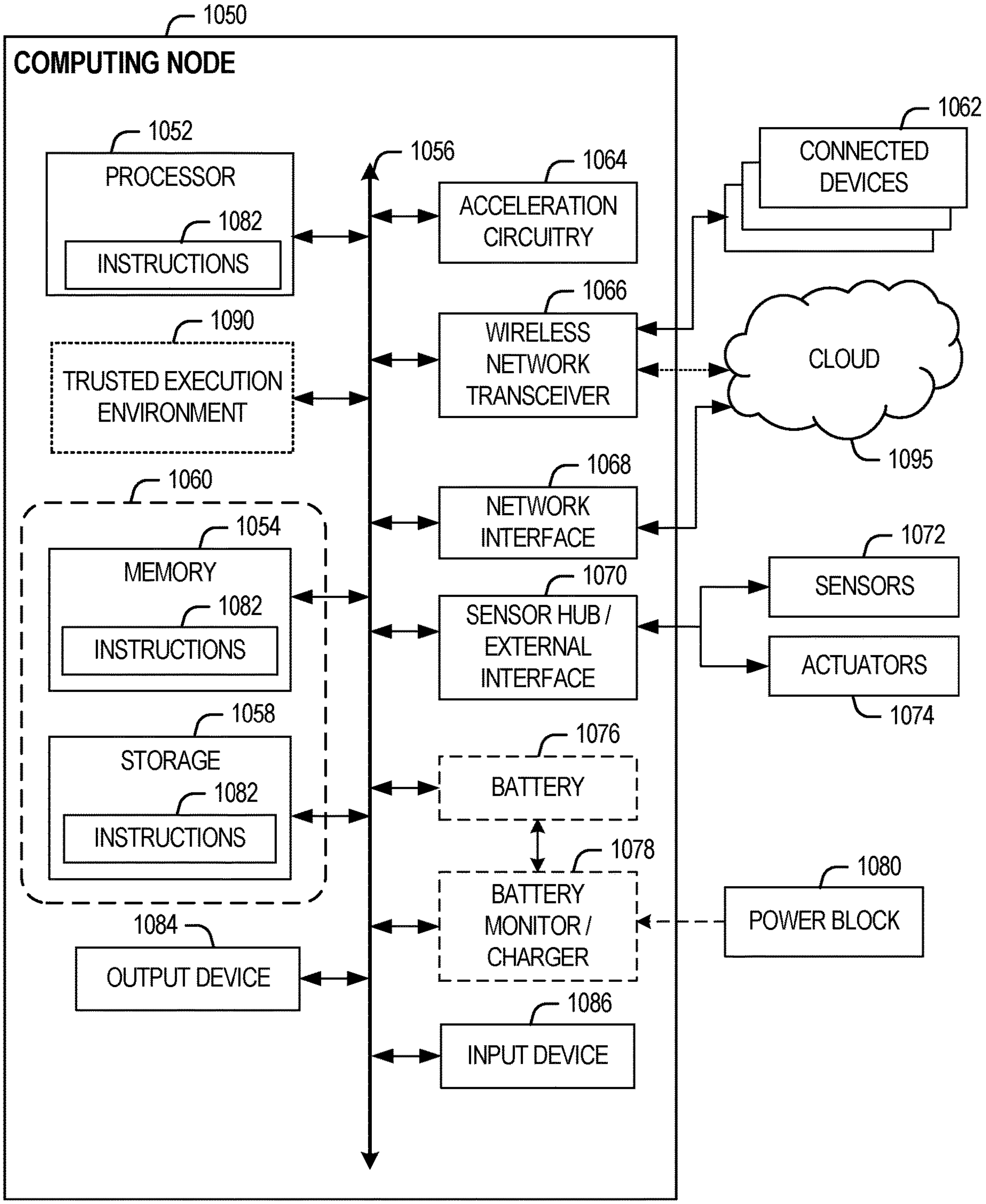
FIG. 10B provides a further overview of example components within a computing device.

In a more detailed example, FIG. 10B illustrates a block diagram of an example of components that may be present in a computing node 1050 for implementing the techniques (e.g., operations, processes, methods, and methodologies) described herein. This computing node 1050 provides a closer view of the respective components of node 1000 when implemented as or as part of a computing device (e.g., as a mobile device, a base station, server, gateway, etc.). The computing node 1050 may include any combinations of the hardware or logical components referenced herein, and it may include or couple with any device usable with an communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1050, or as components otherwise incorporated within a chassis of a larger system.

The computing device 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the computing node 1050 may communicate with close devices, e.g., within about 10 meters, using a local transceiver based on Bluetooth Low Energy (BLE), or another low power radio, to save power. More distant connected devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the cloud 1095 via local or wide area network protocols. The wireless network transceiver 1066 may be a low-power wide-area (LPWA) transceiver that follows the IEEE 802.15.4, or IEEE 802.15.4g standards, among others. The computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the cloud 1095 or to other devices, such as the connected devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the computing node 1050 to actuators 1074, such as power switches, valve actuators, an audible sound generator, a visual warning device, and the like.

In some optional examples, various input/output (I/O) devices may be present within or connected to, the computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1050. A display or console hardware, in the context of the present system, may be used to provide output and receive input of an computing system; to manage components or services of a computing system; identify a state of a computing component or service; or to conduct any other number of management or administration functions or service use cases.

A battery 1076 may power the computing node 1050, although, in examples in which the computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram (s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) may configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 11:
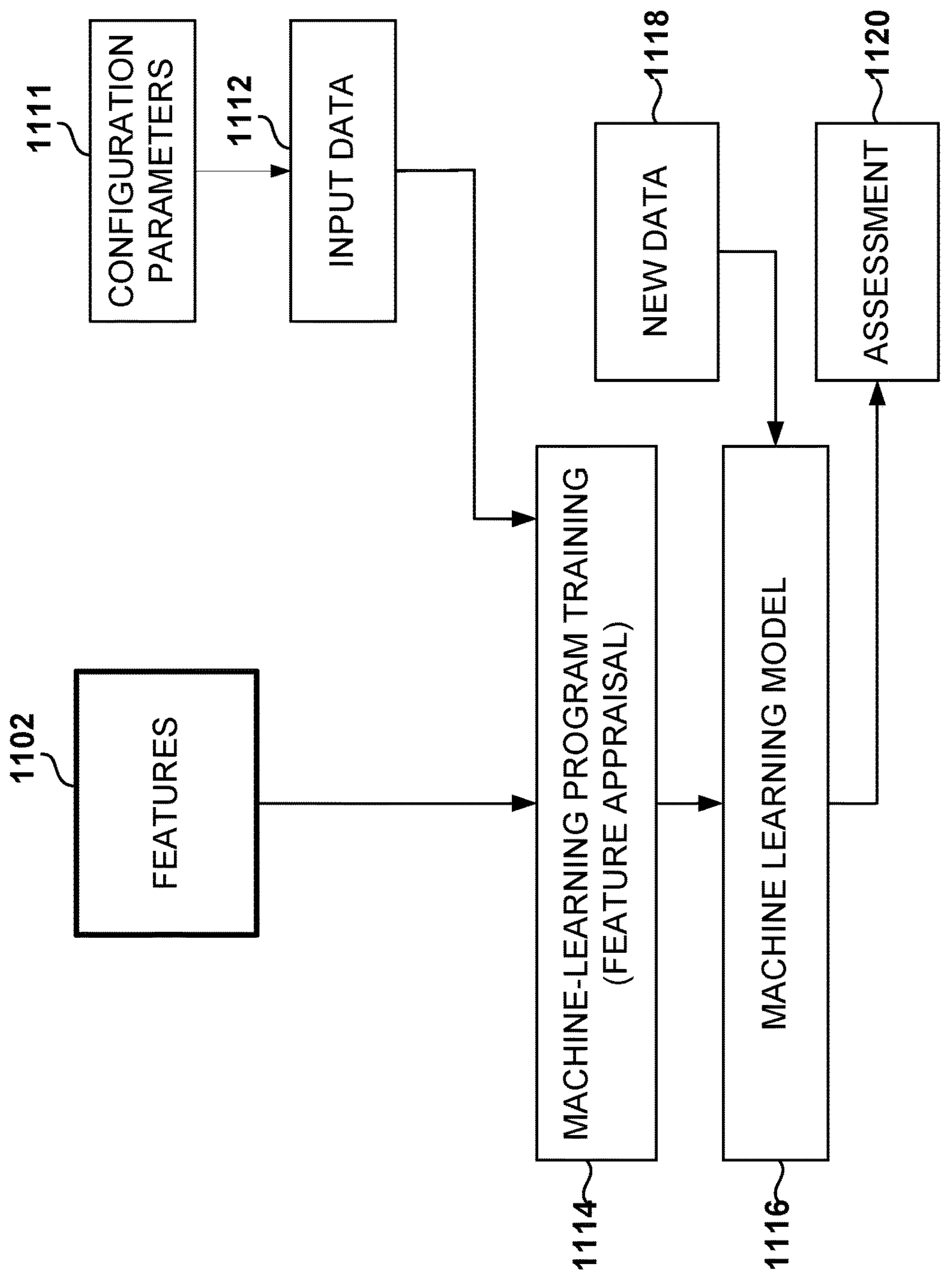
FIG. 11 illustrates training and use of a machine-learning program in accordance with some example examples.

FIG. 11 illustrates the training and use of a machine-learning program, according to some example embodiments. In some example embodiments, machine-learning programs (MLPs), also referred to as machine-learning algorithms or tools, are utilized to coordinate robots to perform a complex task.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Although example embodiments are presented with respect to a few machine-learning tools, the principles presented herein may be applied to other machine-learning tools.

Unsupervised ML is the training of an ML algorithm using information that is neither classified nor labeled, and allowing the algorithm to act on that information without guidance. Unsupervised ML is useful in exploratory analysis because it can automatically identify structure in data.

Some common tasks for unsupervised ML include clustering, representation learning, and density estimation. Some examples of commonly used unsupervised-ML algorithms are K-means clustering, principal component analysis, and autoencoders. In some embodiments, example ML model 1116 outputs actions for one or more robots to achieve a task, to identify an unsafe robot action or unsafe robot, detect a safety event, generate a safety factor, or the like.

The machine-learning algorithms use data 1112 (e.g., action primitives or interaction primitives, goal vector, reward, etc.) to find correlations among identified features 1102 that affect the outcome. A feature 1102 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

During training 1114, the ML algorithm analyzes the input data 1112 based on identified features 1102 and configuration parameters 1111 defined for the training (e.g., environmental data, state data, robot sensor data, etc.). The result of the training 1114 is an ML model 1116 that is capable of taking inputs to produce an output.

Training an ML algorithm involves analyzing data to find correlations. The ML algorithms utilize the input data 1112 to find correlations among the identified features 1102 that affect the outcome or assessment 1120.

The ML algorithms usually explore many possible functions and parameters before finding what the ML algorithms identify to be the best correlations within the data; therefore, training may make use of large amounts of computing resources and time, such as many iterations for a Reinforcement Learning technique.

Many ML algorithms include configuration parameters 1111, and the more complex the ML algorithm, the more parameters there are that are available to the user. The configuration parameters 1111 define variables for an ML algorithm in the search for the best ML model.

When the ML model 1116 is used to perform an assessment, new data 1118 is provided as an input to the ML model 1116, and the ML model 1116 generates the assessment 1120 as output.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is at least one machine readable medium of at least one computing device of a network, including instructions, which when executed by processing circuitry, cause the processing circuitry to: collect telemetry data for a robot, the robot operated according to a path control plan generated using reinforcement learning with a safety factor as a reward function; detect that a safety event, involving a robot action, has occurred with the robot and an object; simulate, using the telemetry data, a recreation of the safety event to determine whether a simulated action matches the robot action; in response to determining that the simulated action does not match the robot action, update a robot failure count corresponding to the robot; and store the updated robot failure count.

In Example 2, the subject matter of Example 1 includes, wherein the safety factor is generated using a trained neural network.

In Example 3, the subject matter of Examples 1-2 includes, wherein the reward function is identified based on at least one of an operational environment, a user-selected safety threshold, or a robot task.

In Example 4, the subject matter of Examples 1-3 includes, wherein the path control plan is iteratively adjusted using the reinforcement learning based on captured data of the robot, the captured data generated by a camera or a sensor.

In Example 5, the subject matter of Examples 1-4 includes, wherein the telemetry data is stored in a cyclic buffer.

In Example 6, the subject matter of Examples 1-5 includes, wherein the telemetry data is stored on the at least one computing device of the network.

In Example 7, the subject matter of Examples 1-6 includes, wherein the object is a human.

In Example 8, the subject matter of Examples 1-7 includes, wherein detecting that the safety event has occurred includes determining that the robot was within a proximity threshold to the object.

In Example 9, the subject matter of Examples 1-8 includes, wherein detecting that the safety event has occurred includes determining that the robot activated a safety maneuver.

In Example 10, the subject matter of Examples 1-9 includes, wherein detecting that the safety event has occurred includes determining that a collision occurred between the robot and the object.

In Example 11, the subject matter of Examples 1-10 includes, wherein detecting that the safety event has occurred includes determining that the robot achieved an acceleration above a threshold.

In Example 12, the subject matter of Examples 1-11 includes, outputting the updated robot failure count for display.

In Example 13, the subject matter of Example 12 includes, wherein outputting the updated robot failure count for display includes outputting the updated robot failure count for display when the updated robot failure count indicates a failure rate above a minimum failure rate.

In Example 14, the subject matter of Examples 1-13 includes, determining whether the updated robot failure count indicates that the robot operated in an unsafe state, and in response to determining that the robot operated in an unsafe state, performing a remediation for the robot including at least one of quarantining the robot away from humans, deactivating the robot, or removing the robot from a current task.

In Example 15, the subject matter of Examples 1-14 includes, predicting, using the updated robot failure count, a future failure of the robot, and outputting an indication of the future failure of the robot for display.

Example 16 is a device in a network, the device comprising: processing circuitry; and memory including instructions, which when executed by the processing circuitry, cause the processing circuitry to perform operations to: collect telemetry data for a robot, the robot operating according to a path control plan generated using reinforcement learning with a safety factor as a reward function; detect that a safety event, involving a robot action, has occurred with the robot and an object; simulate, using the telemetry data, a recreation of the safety event to determine whether a simulated action matches the robot action; update in response to determining that the simulated action does not match the robot action, a robot failure count corresponding to the robot; and store the updated robot failure count.

In Example 17, the subject matter of Example 16 includes, wherein the safety factor is generated using a trained neural network.

In Example 18, the subject matter of Examples 16-17 includes, wherein the telemetry data is stored in a cyclic buffer at the device.

In Example 19, the subject matter of Examples 16-18 includes, wherein to detect that the safety event has occurred, the instructions further include operations to at least one of determine that the robot was within a proximity threshold to the object, determine that the robot activated a safety maneuver, determine that a collision occurred between the robot and the object, or determine that the robot achieved an acceleration above a threshold.

In Example 20, the subject matter of Examples 16-19 includes, wherein the instructions further include operations to output the updated robot failure count for display when the updated robot failure count indicates a failure rate above a minimum failure rate.

In Example 21, the subject matter of Examples 16-20 includes, wherein the instructions further include operations to determine whether the updated robot failure count indicates that the robot is unsafe, and in response to determining that the robot is unsafe, perform a remediation for the robot including at least one of quarantining the robot away from humans, deactivating the robot, or removing the robot from a current task.

Example 22 is an apparatus comprising: means for obtaining telemetry data for a robot, the robot operating according to a path control plan generated using reinforcement learning with a safety factor as a reward function; means for detecting that a safety event, involving a robot action, has occurred with the robot and an object; means for simulating, using the telemetry data, a recreation of the safety event to determine whether a simulated action matches the robot action; in response to determining that the simulated action does not match the robot action, means for updating a robot failure count corresponding to the robot; and means for storing the updated robot failure count.

In Example 23, the subject matter of Example 22 includes, means for outputting the updated robot failure count for display when the updated robot failure count indicates a failure rate above a minimum failure rate.

In Example 24, the subject matter of Examples 22-23 includes, wherein the means for storing the updated robot failure count includes means for displaying the updated robot failure count when the updated robot failure count indicates a failure rate above a minimum failure rate.

In Example 25, the subject matter of Examples 1-24 includes, means for determining whether the updated robot failure count indicates that the robot operated in an unsafe state, and in response to determining that the robot operated in an unsafe state, means for performing a remediation for the robot including at least one of quarantining the robot away from humans, means for deactivating the robot, or means for removing the robot from a current task.

Example 26 is a method performed in a network with at least one edge device comprising: collect telemetry data for a robot; detect that a safety event, including a robot action, has occurred with the robot and an object; using the telemetry data, simulate a recreation of the safety event to determine whether a simulated action matches the robot action; in response to determining that the simulated action does not match the robot action, updating a robot failure count corresponding to the robot; storing the updated robot failure count.

In Example 27, the subject matter of Example 26 includes, wherein the telemetry data is stored in a cyclic buffer.

In Example 28, the subject matter of Examples 26-27 includes, wherein the telemetry data is stored on the at least one edge device of the network.

In Example 29, the subject matter of Examples 26-28 includes, wherein the object is a human.

In Example 30, the subject matter of Examples 26-29 includes, wherein detecting that the safety event has occurred includes determining that the robot was within a proximity threshold to the object.

In Example 31, the subject matter of Examples 26-30 includes, wherein detecting that the safety event has occurred includes determining that the robot activated a safety maneuver.

In Example 32, the subject matter of Examples 26-31 includes, wherein detecting that the safety event has occurred includes determining that a collision occurred between the robot and the object.

In Example 33, the subject matter of Examples 26-32 includes, wherein detecting that the safety event has occurred includes determining that the robot achieved an acceleration above a threshold.

In Example 34, the subject matter of Examples 26-33 includes, outputting the updated robot failure count for display.

In Example 35, the subject matter of Example 34 includes, wherein outputting the updated robot failure count for display includes outputting the updated robot failure count for display when the updated robot failure count indicates a failure rate above a minimum failure rate.

In Example 36, the subject matter of Examples 26-35 includes, determining whether the updated robot failure count indicates that the robot is unsafe, and in response to determining that the robot is unsafe, performing a remediation for the robot including at least one of quarantining the robot away from humans, deactivating the robot, or removing the robot from a current task.

In Example 37, the subject matter of Examples 26-36 includes, predicting, using the updated robot failure count a future failure of the robot, and outputting an indication of the future failure of the robot for display.

Example 38 is a method performed in a network with at least one edge device comprising: modeling various safety critical scenarios in a simulated environment including a plurality of robots and at least one human; estimating probabilities of safety risk events with stochastic input parameters using the modeling; training a neural network using the modeling and the probabilities to output a safety risk factor for a particular input environment; using the safety risk factor as a reward function in a reinforcement learning model to generate a path control plan for a robot in the particular input environment, the reinforcement learning model including a goal reward function for movement of the robot; outputting the path control plan.

In Example 39, the subject matter of Example 38 includes, wherein the safety risk factor reward function is identified based on at least one of an operational environment, a user-selected safety threshold, or a robot task.

In Example 40, the subject matter of Examples 38-39 includes, wherein the path control plan is iteratively adjusted using the reinforcement learning based on captured data of the robot, the captured data generated by a camera or a sensor.

In Example 41, the subject matter of Examples 38-40 includes, wherein the neural network is iteratively adjusted using the reinforcement learning based on captured data of the robot, the captured data generated by a camera or a sensor.

In Example 42, the subject matter of Examples 38-41 includes, wherein outputting the path control plan includes sending the path control plan to the robot.

In Example 43, the subject matter of Examples 38-42 includes, wherein a safety risk event occurs when the robot is within a proximity threshold to the at least one human.

In Example 44, the subject matter of Examples 38-43 includes, wherein a safety risk event occurs when the robot activates a safety maneuver.

In Example 45, the subject matter of Examples 38-44 includes, wherein a safety risk event occurs when a collision is detected between the robot and the at least one human.

In Example 46, the subject matter of Examples 38-45 includes, wherein a safety risk event occurs when the robot achieves an acceleration above a threshold.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Another example implementation is an edge computing system, including respective edge processing devices and nodes to invoke or perform the operations of Examples 1-46, or other subject matter described herein.

Another example implementation is a client endpoint node, operable to invoke or perform the operations of Examples 1-46, or other subject matter described herein.

Another example implementation is an aggregation node, network hub node, gateway node, or core data processing node, within or coupled to an edge computing system, operable to invoke or perform the operations of Examples 1-46, or other subject matter described herein.

Another example implementation is an access point, base station, road-side unit, street-side unit, or on-premise unit, within or coupled to an edge computing system, operable to invoke or perform the operations of Examples 1-46, or other subject matter described herein.

Another example implementation is an edge provisioning node, service orchestration node, application orchestration node, or multi-tenant management node, within or coupled to an edge computing system, operable to invoke or perform the operations of Examples 1-46, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-46, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-46, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-46, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-46, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-46, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-46, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-46, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-46 or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-46, or other subject matter described herein.

Another example implementation is an apparatus of an edge computing system comprising means, logic, modules, or circuitry to invoke or perform the use cases discussed herein, with use of Examples 1-46, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A non-transitory machine-readable medium of a computing device of a network, including instructions, which when executed by processing circuitry, cause the processing circuitry to:

retrieve activity data for a robot from a cyclic buffer that stores a temporal window of the activity data, the robot being operated according to a path control plan generated using reinforcement learning with a safety factor as a reward function;

detect a safety event between the robot and an object that resulted in no collision between the robot and the object;

in response to detecting the safety event, execute a robot processing chain using the activity data from the cyclic buffer to generate a simulated recreation of the safety event, and determine whether a simulated robot action performed during the simulated recreation of the detected safety event matches an executed robot action performed during the detected safety event; and in response to determining that the simulated robot action does not match the executed robot action, update a robot failure count corresponding to the robot, wherein the robot failure count is not updated when the simulated robot action matches the executed robot action.

2. The non-transitory machine-readable medium of claim 1, wherein the safety factor is generated using a trained neural network.

3. The non-transitory machine-readable medium of claim 1, wherein the reward function is identified based on an operational environment, a user-selected safety threshold, or a robot task.

4. The non-transitory machine-readable medium of claim 1, wherein the path control plan is iteratively adjusted using control logic based on camera or sensor data of the robot.

5. The non-transitory machine-readable medium of claim 1, wherein the activity data is stored on the computing device of the network.

6. The non-transitory machine-readable medium of claim 1, wherein the object is a human.

7. The non-transitory machine-readable medium of claim 1, wherein detecting that the safety event has occurred comprises determining that the robot was within a proximity threshold of the object or within a time horizon to the object.

8. The non-transitory machine-readable medium of claim 1, wherein detecting that the safety event has occurred comprises determining that the robot activated a safety maneuver.

9. The non-transitory machine-readable medium of claim 1, wherein the instructions, when executed by processing circuitry, further cause the processing circuitry to detect that a second safety event has occurred by determining that a collision occurred between the robot and the object and, in response, to update the robot failure count corresponding to the robot.

10. The non-transitory machine-readable medium of claim 1, wherein detecting that the safety event has occurred comprises determining that the robot achieved an acceleration above a threshold.

11. The non-transitory machine-readable medium of claim 1, wherein the instructions, when executed by processing circuitry, further cause the processing circuitry to output the updated robot failure count for display.

12. The non-transitory machine-readable medium of claim 11, wherein the updated robot failure count is output when the updated robot failure count indicates a failure rate above a minimum failure rate.

13. The non-transitory machine-readable medium of claim 1, wherein the instructions, when executed by processing circuitry, further cause the processing circuitry to trigger a remediation for the robot when the updated robot failure count indicates that the robot operated in an unsafe state, wherein the remediation comprises quarantining the robot away from humans, deactivating the robot, or removing the robot from a current task.

14. The non-transitory machine-readable medium of claim 1, wherein the instructions, when executed by processing circuitry, further cause the processing circuitry to:

predict, using the updated robot failure count, a future failure of the robot; and output an indication of the future failure of the robot for display.

15. A device in a network, the device comprising:

processing circuitry; and memory including instructions, which when executed by the processing circuitry, cause the processing circuitry to perform operations to:

retrieve activity data for a robot from a cyclic buffer that stores a temporal window of the activity data, the robot being operated according to a path control plan generated using reinforcement learning with a safety factor as a reward function;

detect a safety event between the robot and an object that resulted in no collision between the robot and the object;

in response to detecting the safety event, execute a robot processing chain using the activity data from the cyclic buffer to generate a simulated recreation of the safety event, and determine whether a simulated robot action performed during the simulated recreation of the detected safety event matches an executed robot action performed during the detected safety event; and in response to determining that the simulated robot action does not match the executed robot action, update a robot failure count corresponding to the robot, wherein the robot failure count is not updated when the simulated robot action matches the executed robot action.

16. The device of claim 15, wherein the safety factor is generated using a trained neural network.

17. The device of claim 15, wherein the instructions, when executed by the processing circuitry, further cause the processing circuitry to detect that the safety event has occurred by (i) determining that the robot was within a proximity threshold of the object or within a time horizon to the object, (ii) determining that the robot activated a safety maneuver, or (iii) determining that the robot achieved an acceleration above a threshold.

18. The device of claim 15, wherein the instructions, when executed by the processing circuitry, further cause the processing circuitry to output the updated robot failure count for display when the updated robot failure count indicates a failure rate above a minimum failure rate.

19. The device of claim 15, wherein the instructions, when executed by the processing circuitry, further cause the processing circuitry to trigger a remediation for the robot when the updated robot failure count indicates that the robot operated in an unsafe state, wherein the remediation comprises quarantining the robot away from humans, deactivating the robot, or removing the robot from a current task.

20. An apparatus comprising:

means for retrieving activity data for a robot from a cyclic buffer that stores a temporal window of the activity data, the robot being operated according to a path control plan generated using reinforcement learning with a safety factor as a reward function;

means for detecting a safety event between the robot and an object that resulted in no collision between the robot and the object;

in response to detecting the safety event, means for executing a robot processing chain using the activity data from the cyclic buffer to generate a simulated recreation of the safety event and to determine whether a simulated robot action performed during the simulated recreation of the detected safety event matches an executed robot action performed during the detected safety event; and in response to determining that the simulated robot action does not match the executed robot action, means for updating a robot failure count corresponding to the robot, wherein the robot failure count is not updated when the simulated robot action matches the executed robot action.

21. The apparatus of claim 20, further comprising:

means for outputting the updated robot failure count for display when the updated robot failure count indicates a failure rate above a minimum failure rate.

22. The apparatus of claim 20, further comprising:

means for storing the updated robot failure count, wherein the means for storing the updated robot failure count comprises means for displaying the updated robot failure count when the updated robot failure count indicates a failure rate above a minimum failure rate.

23. The apparatus of claim 20, wherein when the updated robot failure count indicates that the robot operated in an unsafe state, a remediation for the robot is triggered, the remediation comprising quarantining the robot away from humans, deactivating the robot, or removing the robot from a current task.

24. The non-transitory machine-readable medium of claim 1, wherein when the robot failure count increases above a threshold, the processing circuitry transitions from executing the robot processing chain in response to detecting safety events to continuously executing the robot processing chain to monitor the robot.

25. The non-transitory machine-readable medium of claim 1, wherein the instructions further cause the processing circuitry to:

perform additional simulated recreations of the safety event with varied parameters of the object to identify potential robot failures and software bugs, wherein the robot failure count is updated for robot failures but not for software bugs.

* * * * *